United States Patent [19]
Offenwanger et al.

[11] Patent Number: 5,971,356
[45] Date of Patent: Oct. 26, 1999

[54] ELECTROMAGNETICALLY ACTUABLE VALVE

[75] Inventors: Wolfgang Offenwanger, Olbronn-Durren; Karl Bermes, Echternacherbruck, both of Germany

[73] Assignee: Luxembourg Patent Company, S.A., Luxembourg

[21] Appl. No.: 08/715,334

[22] Filed: Sep. 18, 1996

[30] Foreign Application Priority Data

Sep. 18, 1995 [LU] Luxembourg ............................. 88 659

[51] Int. Cl.⁶ .................................................. F16K 31/02
[52] U.S. Cl. .............................. 251/129.07; 137/614.16; 251/26; 251/30.02; 251/129.03; 251/282
[58] Field of Search ........................... 137/614.19, 614.2, 137/907, 614.16; 251/129.08, 129.15, 26, 30.01, 30.02, 44, 129.07, 282

[56] References Cited

U.S. PATENT DOCUMENTS

| | | | |
|---|---|---|---|
| 787,967 | 4/1905 | Wilson | 137/614.2 |
| 2,654,393 | 10/1953 | Ghormley | 137/657 |
| 2,694,544 | 11/1954 | Hall | 251/35 |
| 2,969,088 | 1/1961 | Kramer | 137/614.2 |
| 3,183,932 | 5/1965 | Karpus, Jr. | 137/614.19 |
| 4,074,700 | 2/1978 | Engle | 251/129.15 |
| 4,475,513 | 10/1984 | Flaig et al. | 137/614.2 |
| 4,529,166 | 7/1985 | Klausen et al. | 251/129.15 |
| 4,531,707 | 7/1985 | Dotti et al. | 251/44 |
| 4,662,600 | 5/1987 | Schwelm | 251/44 |
| 4,774,976 | 10/1988 | Janecke et al. | 251/129.08 |
| 4,905,959 | 3/1990 | Andersson | 251/44 |
| 5,039,069 | 8/1991 | Friederichs et al. | 251/44 |
| 5,080,324 | 1/1992 | Chi | 251/44 |
| 5,172,724 | 12/1992 | Tsuzuki et al. | 137/614.2 |
| 5,249,998 | 10/1993 | Gonfiantini | 137/614.19 |
| 5,294,089 | 3/1994 | LaMarca | 251/30.02 |
| 5,346,176 | 9/1994 | Fujimoto et al. | 251/129.15 |
| 5,364,067 | 11/1994 | Linker, Jr. | 251/129.15 |

FOREIGN PATENT DOCUMENTS

| | | |
|---|---|---|
| 1048601 | 12/1953 | France . |
| 864496 | 12/1952 | Germany . |
| 24 39 271 | 3/1976 | Germany . |
| 60175878 | 10/1985 | Japan . |

*Primary Examiner*—George L. Walton
*Attorney, Agent, or Firm*—Leydig, Voit & Mayer, Ltd.

[57] ABSTRACT

The valve according to the invention in intended, in particular, for high-pressure gas containers containing up to 300 bar. It comprises a shut-off element which is hold on its valve seat under the action of a compression spring and of the gas pressure. In order that the high closing pressure can be overcome with relatively little force, a piston whose top surface has a larger diameter than the diameter of the valve seat is provided on the actuating side. This top surface is situated in a pressure space which can be connected to the interior of the gas container via a pressure-balance passage by means of an electromagnetically actuable closing element.

10 Claims, 4 Drawing Sheets

ELECTROMAGNETICALLY ACTUABLE VALVE

BACKGROUND OF THE INVENTION

The present invention relates to an electromagnetically actuable valve for a gaseous or liquid medium under pressure with a valve housing that can be attached to a gas container, an axial inlet passage, an outlet passage running through a lateral connection stub, an axial hole adjoining the inlet passage, the connection in the form of a shoulder between the inlet passage and the hole being designed as an annular valve seat, with a shut-off element held on the valve seat under the action of a compression spring and of the gas pressure, and a spindle which is guided in leak tight fashion in the hole, can be moved axially and acts on the shut-off element.

The invention relates, in particular, to a valve for high-pressure gas containers, i.e. containers containing up to 300 bar, such as, for example, in fixed fire-extinguishing systems or for carbon-dioxide containers in automatic drinks machines.

To ensure reliable and leak-free sealing with valves of this kind for high-pressure gas, the shut-off element is arranged in such a way that it closes under the gas pressure. On the other hand, however, this means that the high gas pressure has to be overcome with a relatively large amount of force to open the valve.

SUMMARY OF THE INVENTION

The object of the present invention is to provide a valve of the type described at the outset in which the high closing pressure can be overcome with relatively little force.

According to the invention, this object is achieved in the case of the valve described at the outset by virtue of the fact that the end of the spindle remote from the shut-off element is designed as a spindle piston which is guided in a cylindrical guiding sleeve and has a larger diameter than the diameter of the valve seat, in that the spindle and the shut-off element are traversed by an axial pressure-balance passage and in that a pressure space which can be connected to the interior of the gas container via the pressure-balance passage by means of an electromagnetically actuated closing element is formed at the top surface of the spindle piston.

In the valve according to the invention, the high gas pressure in used not only to clone the valve but also to open the shut-off element. This is made possible by the fact that the spindle-piston surface, acted upon by the gas pressure, in the pressure space is larger than the area of the shut-off element effectively acted upon by the pressure, and this is because the diameter of the valve seat in smaller than the diameter of the spindle piston. Given appropriate calculation of these diameters, there therefore arises a differential pressure exerted on the shut-off element by the spindle, and the force associated with this differential pressure is sufficient to raise the shut-off element from its seat counter to the gas pressure and the force of its compression spring and to open the valve.

The end of the guiding sleeve remote from the spindle is closed in a leak-tight fashion and contains a first cylindrical magnet armature, which can be moved axially in the guiding sleeve counter to the action of a closing spring by means of an electromagnetic coil situated in the valve housing, that side of this magnet armature which is associated with the spindle piston having a seal which, under the action of the closing spring, closes off the outlet opening of the pressure-balance passage in the spindle when the coil is not excited.

Preferably the guiding sleeve contains a second movable, cylindrical magnet armature, which is separated from the spindle piston by means of a distance pin arranged along the first magnet armature, the distance pin being longer than the first magnet armature and, when the coil is excited, the two magnet armatures attracting one another counter to the action of the closing spring.

The first magnet armature preferably has an axial pin which is slidable in the second magnet armature and is exposed directly to the action of the closing spring, which is supported against the head of the guiding sleeve.

The spring space formed between the head of the guiding sleeve and the second magnet armature is connected along the lateral surfaces of the magnet armatures to the pressure in the pressure space underneath the first magnet armature.

The outlet opening of the pressure-balance passage into the pressure space is preferably situated in a projection on the top surface of the spindle piston.

The electromagnetic actuation serves merely to establish the pressure connection between the pressure space and the inlet passage. The force required for this actuation is relatively small. Although it takes place counter to the force of the closing spring, it is assisted by the force of the gas pressure.

The outlet opening of the pressure-balance passage into the pressure space is as small as possible, allowing it to be sealed by means of a relatively weak closing spring.

According to a first embodiment, there is a pressure connection between the pressure space and the outlet passage by way of a lateral conduit. In this embodiment, the pressure connection to the pressure space is interrupted under the action of the closing spring when the electromagnetic excitation is interrupted. Since the pressure in the pressure space can be dissipated into the outlet passage via the lateral conduit, the valve closes automatically under the action of the gas pressure and the compression spring on the shut-off element.

According to another embodiment, in the closed position of the valve, the pressure space is connected to the environment by a longitudinal hole in the spindle piston and a radial hole in the valve housing while, in the open position of the valve, the connection between the pressure space and the environment is closed in a leaktight fashion by the spindle piston.

In this embodiment, the valve remains open even when the electromagnetic excitation is interrupted and when the pressure-balance passage is closed because the pressure in the pressure space cannot ba dissipated either into the environment or into the outlet passage.

According to another aspect of the invention, it should be possible to operate the valve with little force even if there is a power failure. To this ends the valve housing has an auxiliary valve by means of which the pressure space can be connected to the inlet passage via a bypass running through the valve housing. This auxiliary valve can be actuated manually by means of a hand lever.

BRIEF DESCRIPTION OF THE DRAWINGS

The invention is described in greater detail below with reference to the attached drawings and to a number of exemplary embodiments. In the drawings.

DETAILED DESCRIPTION OF THE PREFERRED EMBODIMENTS

Figure 1:
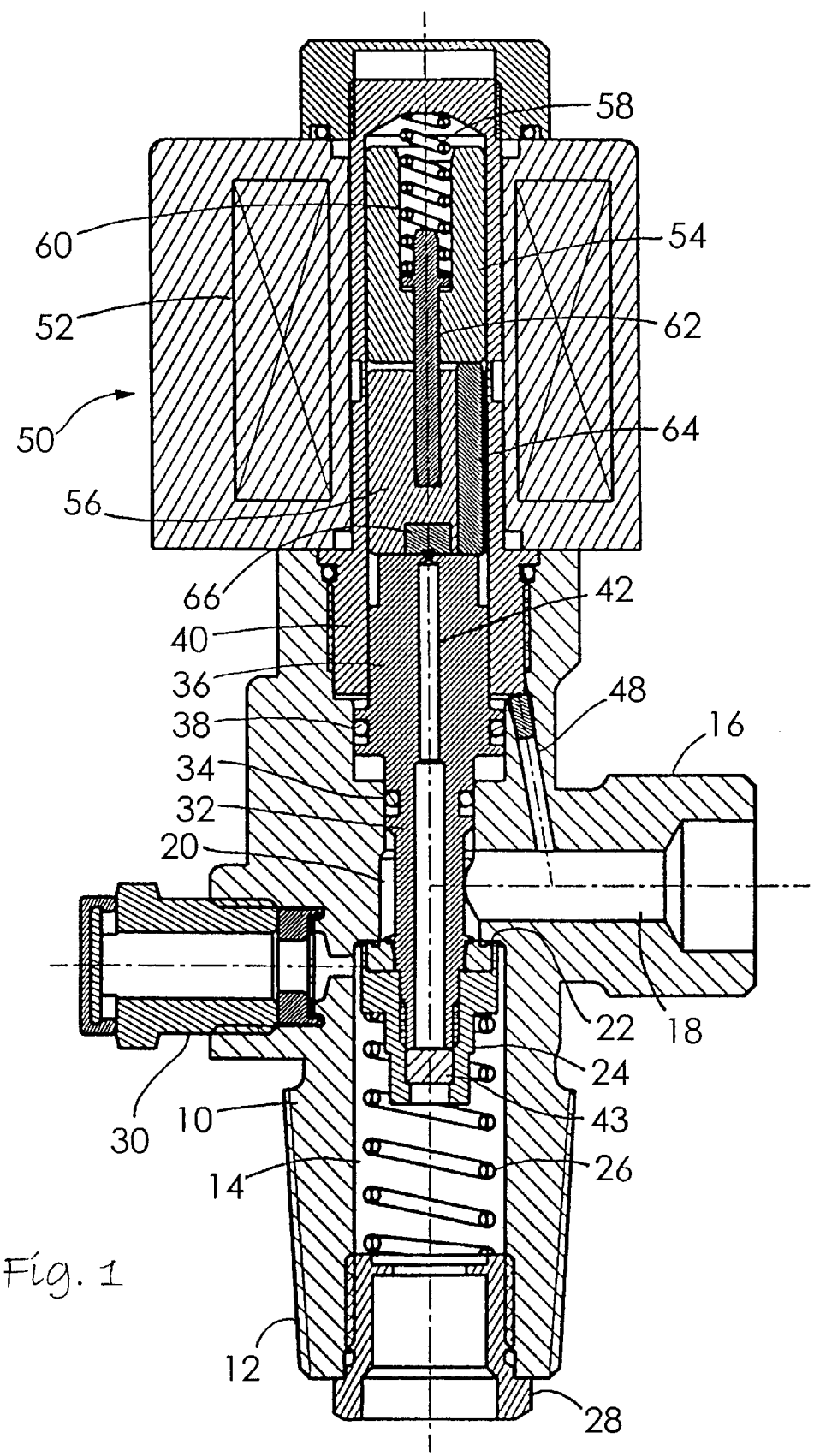
FIG. 1 shows a schematic vertical section through a first embodiment of a valve according to the invention in the closed position.
Figure 2:
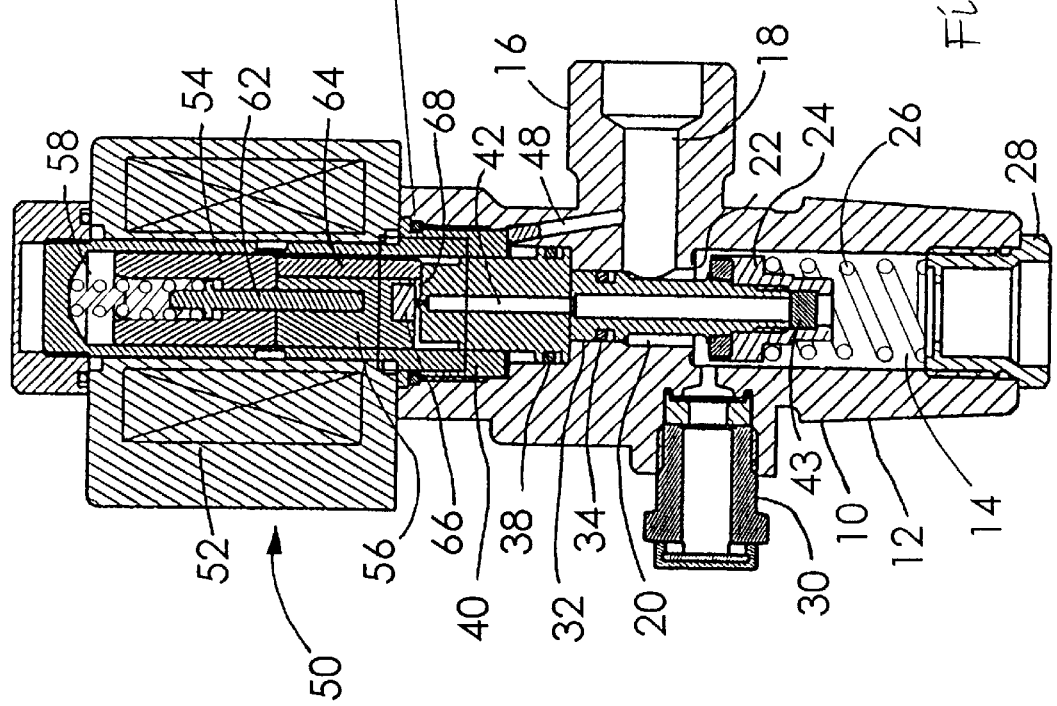
FIG. 2 shown the valve according to FIG. 1 in the open position.

The valve shown in FIGS. 1 and 2 has a valve housing 10, which is, for examples made of metal and has an external thread 12 to allow it to be screwed on to a high-pressure gas cylinder or similar container (not shown). The valve housing 10 has an axial inlet passage 14 and a radial outlet passage 18, the latter running through a lateral connection stub 16.

The inlet passage 14 and the outlet passage 18 are connected in the interior of the valve housing to an axial hole 20. This axial hole 20 has a smaller diameter than the inlet passage 14, and the transition, which is in the form of a shoulder is designed as an annular seat 22 for a shut-off element 24. This shut-off element 24 is subject to the action of a compression spring 26 which is supported against a bushing 28 screwed into the inlet passage 14.

30 indicates a conventional safety valve known per se and consisting, for example, of a rupture disc. In the event of abnormal overpressure in the gas container, this safety valve connects the inlet passage 14 directly to the environment.

In the axial hole 20 there is a spindle 32, the lower end of which extends through the valve seat 22 and is screwed to the shut-off element 24. Above the outlet of the inlet passage 18, the spindle 32 is guided in a sealed manner with an O ring 34. The upper part of the spindle 32 is designed as a widened spindle piston 36, which is guided, likewise in a sealed manner with an O ring 38, in a widened region of the hole 20. As will become clear below, the important thing is that the diameter of the spindle piston 36 should be larger by a few millimeters than the diameter of the valve seat 22.

The upper region of the spindle piston 36 is guided in a cylindrical sleeve 40 that can be screwed into the valve housing 10. This guidance takes place without a seal and is accordingly permeable to gas. This region of the spindle piston 36 is connected to the pressure in the outlet passage by way of a lateral conduit 48 running through the valve housing 10.

Figure 3:
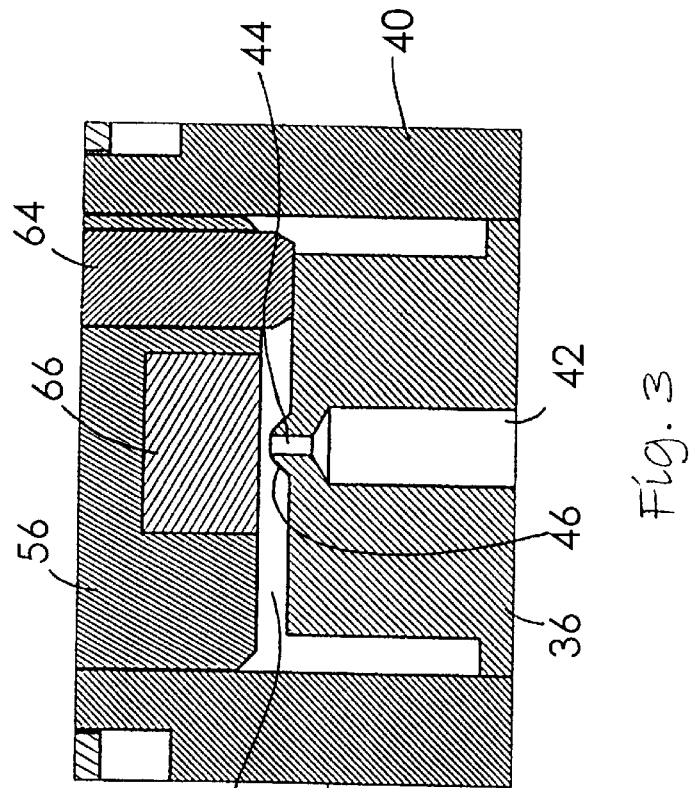
FIG. 3 shows the framed part from FIG. 2 on an enlarged scale.

An axial pressure-balance passage 42 passes through the spindle 32 over its entire length as far as the top surface of the spindle piston 36 and is connected to the pressure in the inlet passage 14 via the shut-off element 24 and, if required, a filter 43 made of sintered material. In the region of the top surface of the spindle piston 36, the pressure-balance passage 42 narrows down to a narrow outlet opening 44 (see also FIG. 3) in a small projection 46 in the centre of the top surface of the spindle piston 36.

The upper part of the housing consists of an electromagnetic actuating device 50 with an electromagnetic coil 52 that is wound around the sleeve 40 and is supplied with electrical current by way of a terminal (not shown).

The actuating device 50 has two cylindrical magnet armatures 54, 56 which lie one above the other and can be displaced in the sleeve 40. The guidance of the two armatures in the sleeve 40 takes place without a seal and is accordingly permeable to gas, for which reason the sleeve 40 is closed in a gas-tight manner above the uppermost armature 54.

Both magnet armatures are exposed to the action of a closing spring 58 which is held between the head of the guiding sleeve 40 and a central hole 60 in the upper magnet armature 54. To ensure that the action of this spring is likewise transmitted to the lower magnet armature 56, the latter has an axial pin 62 which extends displaceably through the upper armature 54 into the hole 60 and is there acted upon directly by the force of the closing spring 58.

Arranged between the upper magnet armature 54 and the top surface of the spindle piston 36 is a distance pin 64 which extends through or along the lower armature 64. Since this distance pin 64 is somewhat longer than the lower magnet armature 56, the action of the force of the closing spring 58 gives rise to a gap between the two magnet armatures 54 and 56.

A seal 66 assigned to the outlet opening 44 in the spindle piston 36 is provided on the underside of the lowermost magnet armature 56.

When the actuating device 50 is not excited, the shut-off element is held in the closed position on the valve seat by the action of the force of the compression spring 26 and the force of the gas pressure in the gas container, thus blocking the flow of gas in the direction of the outlet opening 18.

Under the action of the force of the closing spring 58, the lower magnet armature 56 remains in the lowermost position, that is shown in FIG. 1, and the seal 66 thus blocks the outlet opening 44 in the spindle piston 36.

When the coil 52 of the actuating device 50 is excited, the coil 52 generates a magnetic field which builds up opposite charges at the boundary surfaces of the magnet armatures 54, 56. An a result, the two magnet armatures 54, 56 are attracted to one another counter to the action of the spring 58. Since the distance pin 64 prevents displacement of the upper magnet armature 54, the lower magnet armature 56 is pulled against the upper magnet armature 54, with the result that the gap shown in FIG. 1 at the interface between the magnet armatures 54, 56 shifts to between magnet armature 56 and the spindle piston 36 and here forms a pressure space 68 (see FIG. 3).

When magnet armature 56 rises from the spindle piston 36, the outlet opening is freed, allowing the gas to flow through the pressure-balance passage 42, and the pressure in the pressure space 68 rises to the pressure prevailing in the inlet passage 14. Since, as already mentioned above, the diameter of the spindle piston 36 is somewhat larger than the diameter of the valve seat 22, the spindle 32 is acted upon by a downward differential pressure force which is, higher than the force of the compression spring 26, with the result that the spindle 32 and the shut-off element 24 are displaced downwards counter to the compression spring 26 (see FIG. 2) and the flow of the gas in the direction of the outlet passage is accordingly enabled.

As FIG. 2 shows, the two magnet armatures 54, 56 follow the downward movement of the spindle piston 36 under the action of the closing spring 60. As long as the coil 52 remains excited, the lowermost magnet armature 56 is attracted by armature 54, with the result that the outlet opening 44 remains open and the pressure in the pressure space 68 maintains the flow through the valve.

When the excitation of the coil 52 is interrupted, the magnetic field collapses, with the result that armature 56 is no longer attracted by armature 54 and armature 56 is pressed downwards against the spindle piston 36 under the action of the closing spring 60. No significant pressure has to be overcome during this process because the two armatures are not seated gas-tightly in the guiding sleeve 40 and are accordingly pressure-balanced. Only the pressure associated with the flow through the outlet opening 44 has to be overcome. However, since this opening 44 is small, the outlet opening 44 is closed by the seal 66 under the action of the spring 60, thus isolating the pressure space 68 from the pressure-balance passage 42 again. Since the spindle piston 36 in not guided in a leaktight fashion in the sleeve 40, the pressure space 68 can be rapidly vented into the outlet passage 18 via the conduit 48, causing the downward-acting differential force to disappear and the valve to close under the action of the compression spring and the gas pressure, assuming the position shown in FIG. 1.

Figure 4:
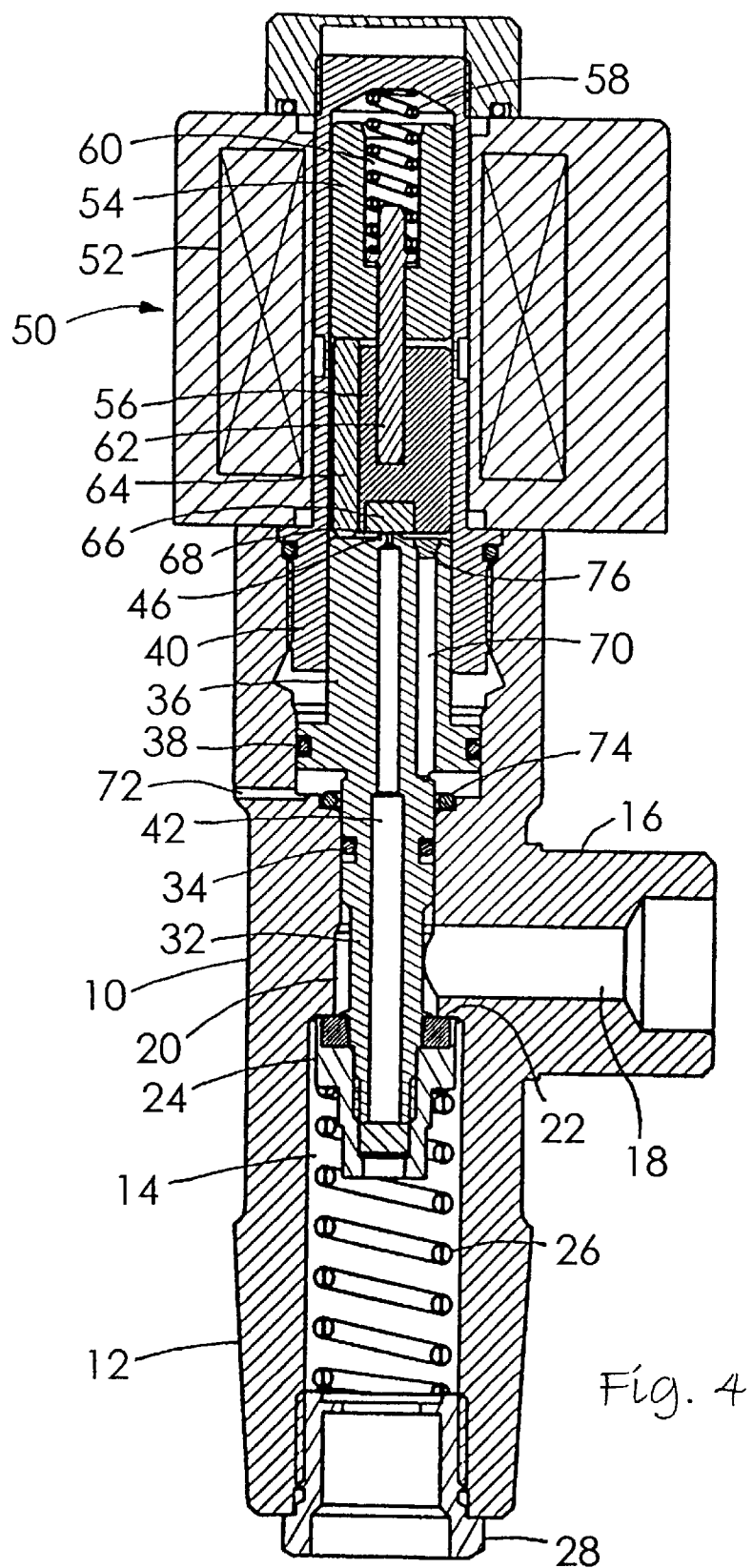
FIG. 4 shows a schematic vertical section through a second embodiment of a valve according to the invention in the closed position.

FIG. 4 shows a section through another embodiment of a valve according to the invention, the reference numerals from FIG. 1 being retained for components with similar functions.

A significant difference between the two embodiments is that in FIG. 4 the lateral conduit 48 of FIG. 1 is absent and that the pressure space 68 is, accordingly, no longer connected to the outlet passage 18.

In the embodiment shown in FIG. 4, however, the spindle piston 36 has a longitudinal hole 70, while the valve housing 10 is open to the outside through a radial hole 72, between the seals 34 and 38 of the spindle 32 for instance. At the widening in the form of a shoulder of the axial hole 20, between the narrower lower region and the wider upper region, there is furthermore a seal 74, for example an O ring.

The way in which the valve in FIG. 4 operates when opening is the same as that described above in connection with the first embodiment. Since the pressure space 68 is no longer connected to the outlet passage 18 via the spindle piston 36, the pressure space cannot be vented in this direction when the electrical excitation of the coil 52 is interrupted. Pressure dissipation through the radial hole 72 is likewise not possible because the connection between the longitudinal hole 70 and the radial hole 72 is interrupted by the seal 74 in the open position of the valve. Since no pressure dissipation from the pressure space 68 is possible, the valve in the embodiment shown in FIG. 4 remains open even when electromagnetic actuation is discontinued.

The two holes 70 and 72 have no function in the opening and closing of the valve. They are simply vent holes and serve to dissipate small leakages that may arise if the seal 66 of the outlet opening 44 of the spindle piston is defective.

A filter 76 made of sintered material is preferably seated at the pressure-space-end inlet to the hole 70. On the one hand, this filter is sufficiently gas-tight to permit the pressure build-up in the pressure space 68 during the opening phase. On the other hand, however, the filter 76 is also sufficiently gas-permeable to permit pressure dissipation with the valve closed in the event of leaks.

If these vent openings were not present, a leak at this point could lead to a pressure build-up in the pressure space and to spontaneous opening of the valve.

In the embodiment shown in FIG. 1, this precaution is not necessary because venting is possible via the conduit 48.

Figure 5:
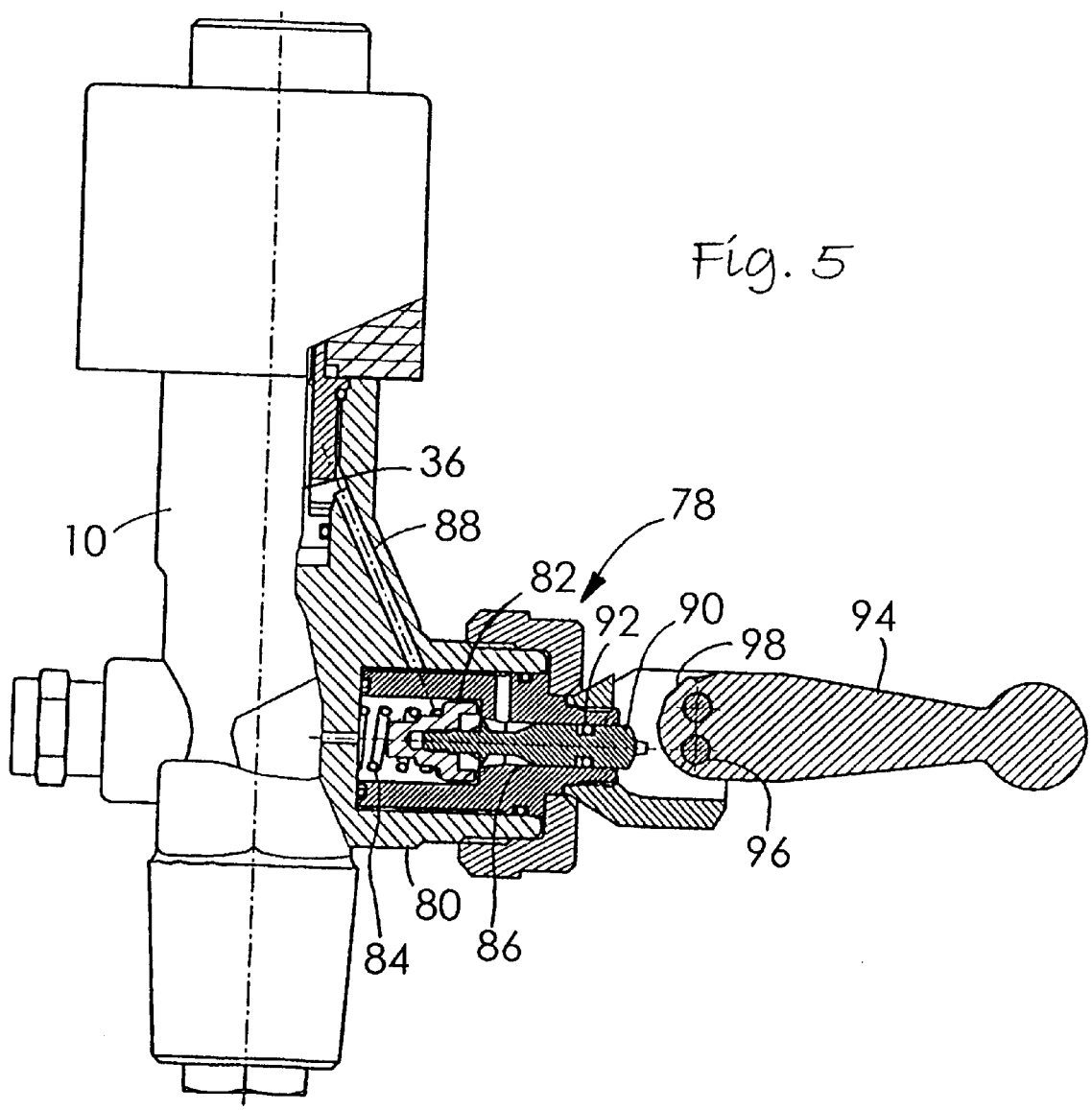
FIG. 5 shows a partial section of a variant that can be employed with the embodiments of FIGS. 1 to 4, with auxiliary actuation in the event of a power failure.

FIG. 5 shows an advantageous development of the inventive concept to allow the valve to be operated even if there is a power failure. This additional measure can be employed with both the embodiments of FIGS. 1 and 4.

According to FIG. 5, the valve housing 10 has a second lateral stub 80, in which an axillary valve 78 is provided. This auxiliary valve 78 comprises a shut-off element 82 which is held leak-tightly on its seat under the action of a spring 84 and of the gas pressure in the gas container.

Downstream of the shut-off element 82 there is a hole 86 which in connected to the pressure in the pressure space 68 above the spindle piston 36 by a bypass 88 (see FIGS. 1 and 4). A tappet 90 with a seal 92 in arranged in a sliding manner in the hole 86. the inner end of the tappet 90 is screwed into the shut-off element 82. A hand lever 94 in provided at the outside of the stub 80, the said lever being pivotable about an eccentric pin 96 and having a cam surface 98.

In the position of the hand lever 94 shown in FIG. 5, the auxiliary valve 78 is closed. If the hand lever 94 is pivoted through 90° in the anti-clockwise direction, the cam surface 98 comes into engagement with the tappet 90, which opens the shut-off element 82 counter to the gas pressure and the force of the spring 84, thus establishing a connection to the pressure space 68 via the bypass 88 and opening the shut-off element 24 (see FIGS. 1 and 4). Just as with electromagnetic release, the gas pressure in the gas container is used to open the valve.

When the hand lever 94 is pivoted back into the starting position shown in FIG. 5, the valve in the embodiment shown in FIG. 1 closes and remains open in the embodiment shown in FIG. 4.

Instead of actuating the auxiliary valve 78 manually by means of a hand lever, it is also possible to provide some other actuating device such as, for example, a pneumatic actuating device.

Although the valve has been described by way of example for a gaseous medium, it can likewise be used for liquid media.

What is claimed is:

1. An electromagnetically actuable valve for a container of pressurized fluid, comprising:

a valve housing attachable to the gas container, the valve housing including an axial inlet passage, an outlet passage, and an axial hole adjoining the inlet passage, the axial hole being connected to the inlet passage by a shoulder, the shoulder defining a valve seat;

a shut-off element held on the annular valve seat under the action of a compression spring and gas pressure, the shut-off element adapted to move between an open position and a closed position;

a spindle sealingly mounted in the axial hole to move axially and act on the shut-off element, an end of the spindle remote from the shut-off element being a spindle piston and having a diameter larger than the diameter of the valve seat, the spindle piston being mounted in a cylindrical guiding sleeve;

an axial pressure-balance passage disposed through the spindle and the shut-off element; and an electromagnetically actuated opening element adapted to form a pressure space proximate the spindle piston when the opening element is activated, the pressure space enabling the pressurized fluid to travel from the container through the axial pressure-balance passage and pressure space to act on the spindle piston, spindle and shut-off element against the action of the compression spring, the pressurized fluid thereby being released through the valve outlet when the shut-off element moves away from the valve seat.

2. An electromagnetically actuable valve for container of pressurized fluid, comprising:

a valve housing attachable to the gas container, the valve housing including an axial inlet passage, and outlet passage, and an axial hole adjoining the inlet passage, the axial hole being connected to the inlet passage by a shoulder, the shoulder defining, a valve seat;

a shut-off element held on the annular valve seat under the action of a compression spring and gas pressure, the shut-off element adapted to move between an opened position and a closed position;

a spindle sealingly mounted in the axial hold to move axially and act on the shut-off element, and into the spindle remote from the shut-off element being a spindle piston and having a diameter larger than the diameter of the valve seat, the spindle piston being mounted in a cylindrical guiding sleeve;

an axial pressure balance passage disposed through the spindle and the shut-off element; and an electromagnetically actuated opening element adapted to form a pressure space proximate the spindle piston when the opening element is activated, the pressure space enabling the pressurized fluid to travel from the container through the axial pressure balance passage and pressure space to act on the spindle piston, spindle and shut-off element against the action of the compression spring, the pressurized fluid thereby being released through the valve outlet when the shut-off element moves away from the valve seat, the end of the guiding sleeve remote from the spindle is closed and contains a first cylindrical magnet armature which can be moved axially in the guiding sleeve counter to the action of a closing spring by means of an electromagnetic coil situated in the valve housing, the side of the first magnet armature which is associated with the spindle piston including a seal which, under the action of the closing spring, closes off the outlet opening of the pressure-balance passage in the spindle when the coil is not excited.

3. The valve according to claim 2, further including a pressure connection between the pressure space and the outlet passage by way of a lateral conduit.

4. The valve according to claim 2, wherein when the valve is closed, the pressure space is connected to the environment by a longitudinal hole in the spindle piston and a radial hole in the valve housing, whereas when the valve is in an open position, the connection between the pressure space and the environment is closed in a leak-tight fashion by the spindle piston by a seal.

5. The valve according to claim 2, wherein the valve housing has an auxiliary valve by means of which the pressure space can be connected to the inlet passage via a bypass running through the valve housing.

6. The valve according to claim 5, wherein the auxiliary valve can be actuated manually by means of a hand lever.

7. An electromagnetically actuable valve for a container of pressurized fluid, comprising:

a valve housing attachable to the gas container, the valve housing including an axial inlet passage, an outlet passage, and an axial hole adjoining the inlet passage, the axial hole being connected to the inlet passage by a shoulder, the shoulder defining a valve seat;

a shut-off element held on the annular valve seat under the action of a compression spring and gas pressure;

a spindle sealingly mounted in the axial hole to move axially and act on the shut-off element, an end of the spindle remote from the shut-off element being a spindle piston and having a diameter larger than the diameter of the valve seat, the spindle piston being mounted in a cylindrical guiding sleeve, the end of the guiding sleeve remote from the spindle being closed;

an axial pressure-balance passage disposed through the spindle and the shut-off element;

an electromagnetically actuated opening element adapted to form a pressure space proximate the spindle piston when the opening element is activated, the pressure space enabling the pressurized fluid to travel from the container through the axial pressure-balance passage and pressure space to act on the spindle piston, spindle and shut-off element against the action of the compression spring, the pressurized fluid thereby being released through the valve outlet when the shut-off element moves away from the valve seat;

a first cylindrical magnet armature which can be moved axially in the guiding sleeve counter to the action of a closing spring by means of an electromagnetically coil situated in the valve housing, the side of the first magnet armature which is associated with the spindle piston including a seal which, under the action of the closing spring, closes off the outlet opening of the pressure-balance passage in the spindle when the coil is not excited; and a second cylindrical magnet armature which can be moved in the guiding sleeve and which is separated from the spindle piston by means of a distance pin arranged along the first magnet armature, the distance pin being longer than the first magnet armature and, when the coil is excited, the two magnet armatures attract one another counter to the action of the closing spring.

8. The valve according to claim 7, wherein the first magnet armature includes an axial pin which is slidable in the second magnet armature and which is exposed directly to the action of the closing spring, and which is supported against the head of the guiding sleeve.

9. The valve according to claim 7, further including a spring space formed between the head of the guiding sleeve and the second magnet armature, the spring space being connected along the lateral surfaces of the magnet armatures to the pressure in the pressure space underneath the first magnet armature.

10. The valve according to claim 2, wherein the outlet opening of the pressure-balance passage into the pressure space is situated in a projection on the top surface of the spindle piston.

* * * * *

UNITED STATES PATENT AND TRADEMARK OFFICE
CERTIFICATE OF CORRECTION

PATENT NO. : 5,971,356
DATED : October 26, 1999
INVENTOR(S) : Wolfgang Offenwanger and Karl Bermes It is certified that errors appear in the above-identified patent and that said Letters Patent is hereby corrected as shown below:

On title page,
In the Abstract, line 3, "hold" should be -- held--.

In column 2 line 49, "ba" should be --be--

In column 2 line 66, "shown" should be --shows--

Signed and Sealed this

Twenty-first Day of March, 2000

Attest:

Attesting Officer

Q. TODD DICKINSON

Commissioner of Patents and Trademarks